United States Patent
Hoover et al.

(10) Patent No.: US 11,231,590 B2
(45) Date of Patent: *Jan. 25, 2022

(54) HEAT TRANSFER THROUGH FRAME COMPONENT OF HEAD-MOUNTED DEVICE

(71) Applicant: Google LLC, Mountain View, CA (US)

(72) Inventors: Christopher Hoover, Mountain View, CA (US); Jay Kothari, San Francisco, CA (US); Alberto Vidal, Mountain View, CA (US); Kenneth Robertson, San Jose, CA (US); Jacques Gagne, Los Gatos, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/038,597

(22) Filed: Sep. 30, 2020

(65) Prior Publication Data
US 2021/0080732 A1 Mar. 18, 2021

Related U.S. Application Data

(63) Continuation of application No. 16/220,885, filed on Dec. 14, 2018, now Pat. No. 10,823,969.

(51) Int. Cl.
*G02B 27/01* (2006.01)
*G06F 1/20* (2006.01)
(Continued)

(52) U.S. Cl.
CPC ......... *G02B 27/0176* (2013.01); *G06F 1/163* (2013.01); *G06F 1/203* (2013.01);
(Continued)

(58) Field of Classification Search
CPC ........ G02B 2027/0178; G02B 27/0176; G06F 1/163; G06F 1/203; H01M 10/613; H01M 10/615; H01M 10/623; H01M 10/653; H01M 10/6552; H01M 10/6554; H01M 10/667; H01M 2220/30; H01M 50/20; Y02E 60/10; G02C 11/08; H05K 7/2039;
(Continued)

(56) References Cited

U.S. PATENT DOCUMENTS 6,341,062 B1 1/2002 Patel
6,653,002 B1 11/2003 Parise
(Continued)

*Primary Examiner* — Richard J Hong
(74) *Attorney, Agent, or Firm* — Lerner, David, Littenberg, Krumholz & Mentlik, LLP

(57) ABSTRACT

An apparatus includes a frame component of a head-mounted device (HMD), an eyepiece, a battery, a processor, a heat pipe, and a hinge. The frame component includes a first compartment, a second compartment, and a channel connecting the first compartment and the second compartment. The heat pipe may extend from the first compartment to the second compartment through a channel and may be configured to transfer heat from the processor to the battery. A rate of heat transfer through the hinge may be greater than a threshold value when the hinge is in an open conformation that configures the frame component to be positioned along the side of the head. The heat transfer through the hinge may be smaller than the threshold value when the hinge is in a folded conformation that configures the frame component to be positioned for storage.

20 Claims, 12 Drawing Sheets

(51) Int. Cl.
*G06F 1/16* (2006.01)
*H01M 10/613* (2014.01)
*H01M 10/623* (2014.01)
*H01M 10/6552* (2014.01)

(52) U.S. Cl.
CPC ....... *H01M 10/613* (2015.04); *H01M 10/623* (2015.04); *H01M 10/6552* (2015.04); *G02B 2027/0178* (2013.01)

(58) Field of Classification Search
CPC ............ H05K 7/20336; H05K 7/20454; G06T 19/006; H01L 23/3733
See application file for complete search history.

(56) References Cited

U.S. PATENT DOCUMENTS

| | | | |
|---|---|---|---|
| 9,740,023 | B1 | 8/2017 | Ashwood |
| 9,761,919 | B2 | 9/2017 | Lane et al. |
| 9,791,704 | B2 | 10/2017 | Nikkhoo |
| 9,839,166 | B2 | 12/2017 | Kim et al. |
| 2009/0208829 | A1 | 8/2009 | Howard et al. |
| 2010/0108291 | A1 | 5/2010 | Onnerud et al. |
| 2013/0136966 | A1 | 5/2013 | Bhardwaj |
| 2015/0220122 | A1 | 8/2015 | Rhee et al. |
| 2015/0342089 | A1* | 11/2015 | Kim .................. H05K 7/20336 361/700 |
| 2015/0350392 | A1 | 12/2015 | Park et al. |
| 2016/0212879 | A1* | 7/2016 | Nikkhoo ............ H05K 7/20454 |
| 2016/0212888 | A1* | 7/2016 | Nikkhoo ............ G02B 27/0176 |
| 2016/0212889 | A1* | 7/2016 | Nikkhoo ............ H01L 23/3733 |
| 2016/0252727 | A1* | 9/2016 | Mack .................... G06T 19/006 345/8 |
| 2016/0341486 | A1 | 11/2016 | Kim et al. |
| 2016/0349520 | A1 | 12/2016 | Bhardwaj et al. |
| 2017/0055372 | A1 | 2/2017 | Ahamed et al. |
| 2017/0099749 | A1* | 4/2017 | Nikkhoo ............ H01L 23/3733 |
| 2017/0142861 | A1 | 5/2017 | McLaughlin et al. |
| 2017/0184863 | A1 | 6/2017 | Balachandreswaran et al. |
| 2017/0248801 | A1* | 8/2017 | Ashwood ............ H05K 7/2039 |
| 2017/0343293 | A1 | 11/2017 | Hurbi et al. |
| 2018/0136491 | A1* | 5/2018 | Ashwood ............... G02C 11/08 |
| 2018/0262043 | A1 | 9/2018 | Yi et al. |
| 2019/0051911 | A1 | 2/2019 | Binder et al. |
| 2019/0346895 | A1 | 11/2019 | Ho et al. |
| 2019/0364695 | A1 | 11/2019 | Lee et al. |

\* cited by examiner

HEAT TRANSFER THROUGH FRAME COMPONENT OF HEAD-MOUNTED DEVICE

CROSS-REFERENCE TO RELATED APPLICATION

The present application is a continuation of U.S. patent application Ser. No. 16/220,885 filed Dec. 14, 2018, the entire contents of which are hereby incorporated by reference.

BACKGROUND

The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a graphic display close enough to a wearer's (or user's) eye(s) such that the displayed image appears as a normal-sized image, such as might be displayed on a traditional image display device. The relevant technology may be referred to as "near-eye displays."

Wearable computing devices with near-eye displays may also be referred to as "head-mountable displays" (HMDs), "head-mounted displays," "head-mounted devices," or "head-mountable devices." A head-mountable display places a graphic display or displays close to one or both eyes of a wearer. To generate the images on a display, a computer processing system may be used. Such displays may occupy a wearer's entire field of view, or only occupy part of wearer's field of view. Further, head-mounted displays may vary in size, taking a smaller form such as a glasses-style display or a larger form such as a helmet, for example.

SUMMARY

In an example embodiment, the frame of an HMD may include therein a battery and various processing components, such as a central processing unit (CPU) and various application-specific integrated circuits (ASICs). A part of the frame which is to be positioned along a side of the bead of the user has defined therein a first compartment that contains the battery and a second compartment that contains the processing components. The first compartment is configured to be positioned on a first side of the ear (e.g., posterior to the ear) of the user while the second compartment is configured to be positioned on a second side of the ear (e.g., anterior to the ear). In order to cool the processing components, the first and second compartments are connected together by a channel. A heat pipe extends through the channel to thermally connect the processing components to the battery. By moving heat away from the processing components and towards the battery, the processing components are cooled, allowing them to operate at higher frequencies, and the battery is heated, allowing it to operate within a desired or acceptable temperature range, thereby improving battery performance in some cases.

In a first embodiment, an apparatus is provided that includes a frame component of a head-mounted device (HMD) configured to secure the HMD to a head of a user. The frame component includes therein (i) a first compartment, (ii) a second compartment, and (iii) a channel connecting the first compartment and the second compartment. The frame component is configured to be positioned along a side of the head with the channel passing over an ear of the head, the first compartment disposed on a first side of the ear, and the second compartment disposed on a second side of the ear. The apparatus also includes a battery disposed within the first compartment, a processor disposed within the second compartment, and a heat pipe extending from the first compartment to the second compartment through the channel. The heat pipe is configured to transfer heat from the processor to the battery.

In a second embodiment, a system is provided that includes a frame component of a head-mounted device (HMD) configured to secure the HMD to a head of a user. The frame component includes therein (i) a first compartment, (ii) a second compartment, and (iii) a channel connecting the first compartment and the second compartment. The frame component is configured to be positioned along a side of the head with the channel passing over an ear of the head, the first compartment disposed posterior to the ear, and the second compartment disposed anterior to the ear. The system also includes a battery disposed within the first compartment, a processor disposed within the second compartment, an eyepiece having a display and a camera, and a hinge connecting the eyepiece to the second compartment of the frame component. The hinge is thermally conductive and configured to thermally connect the eyepiece to the second compartment. The system additionally includes a heat pipe extending from the first compartment to the second compartment through the channel. The heat pipe is configured to transfer heat from the processor and the eyepiece to the battery.

In a third embodiment, a device formed by a process that includes providing a frame component of a head-mounted device (HMD) configured to secure the HMD to a head of a user. The process also includes creating, within the frame component, (i) a first compartment, (ii) a second compartment, and (iii) a channel connecting the first compartment and the second compartment. The frame component is configured to be positioned along a side of the head with the channel passing over an ear of the head, the first compartment disposed on a first side of the ear, and the second compartment disposed on a second side of the ear. The first compartment is configured to house therein a battery. The process additionally includes providing a processor within the second compartment and providing a heat pipe extending from the first compartment to the second compartment through the channel to transfer heat from the processor to the battery.

In a fourth embodiment, a method of manufacturing an HMD includes providing a frame component of a head-mounted device (HMD) configured to secure the HMD to a head of a user. The method also includes creating, within the frame component, (i) a first compartment, (ii) a second compartment, and (iii) a channel connecting the first compartment and the second compartment. The frame component is configured to be positioned along a side of the head with the channel passing over an ear of the head, the first compartment disposed on a first side of the ear, and the second compartment disposed on a second side of the ear. The first compartment is configured to house therein a battery. The method additionally includes providing a processor within the second compartment and providing a heat pipe extending from the first compartment to the second compartment through the channel to transfer heat from the processor to the battery.

The foregoing summary is illustrative only and is not intended to be in any way limiting. In addition to the illustrative aspects, embodiments, and features described above, further aspects, embodiments, and features will

DETAILED DESCRIPTION

Figure 1A:
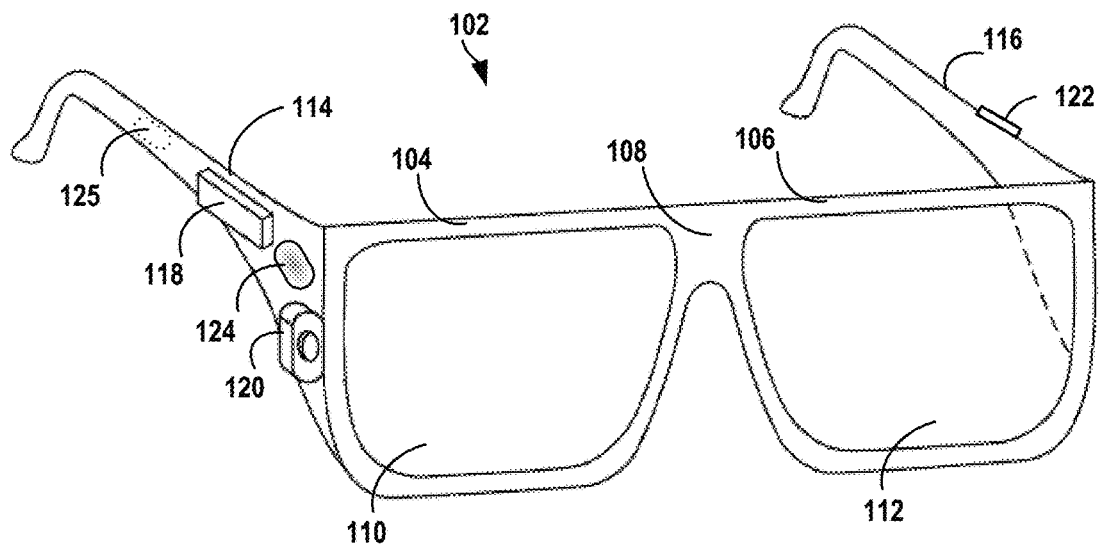
FIG. 1A illustrates a wearable computing system, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless indicated as such. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Throughout this description, the articles "a" or "an" are used to introduce elements of the example embodiments. Any reference to "a" or "an" refers to "at least one," and any reference to "the" refers to "the at least one," unless otherwise specified, or unless the context clearly dictates otherwise. The intent of using the conjunction "or" within a described list of at least two terms is to indicate any of the listed terms or any combination of the listed terms.

The use of ordinal numbers such as "first," "second," "third" and so on is to distinguish respective elements rather than to denote a particular order of those elements. For purpose of this description, the terms "multiple" and "a plurality of" refer to "two or more" or "more than one."

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment. In the figures, similar symbols typically identify similar components, unless context dictates otherwise. Further, unless otherwise noted, figures are not drawn to scale and are used for illustrative purposes only. Moreover, the figures are representational only and not all components are shown. For example, additional structural or restraining components might not be shown.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. OVERVIEW

A head-mountable device (HMD) may include a frame for securing the HMD to a wearer's head. The frame may include a side-arm configured to be positioned at the side of the wearer's head such that an eyepiece connected to the side-arm is positioned in front of the wearer's eye. The eyepiece may include thereon a camera, a display, and a display driver, among other components. The HMD may additionally include a processor, memory, battery, communications module, and various other electronic components that provide the functionality of the HMD. These electronic components may be disposed within compartments defined within the side-arm.

As the size of an HMD decreases to, for example, make the HMD more comfortable to wear for longer periods of time, thermal management of the HMD becomes an important consideration. Namely, as the size of the frame components housing various electronic components decreases, maintaining each of the electronic components within a target operating temperature range becomes more difficult because the heat generated is concentrated in a smaller space and/or becomes more difficult to dissipate. Therefore, it is desirable for thermal management measures to improve heat dissipation and transfer without significantly affecting the small form factor of an HMD frame.

Notably, operating an electronic component within its corresponding operating temperature range can improve performance and/or extend the life of the component. For example, when the temperature of a processor rises above a threshold temperature, the operating frequency of the processor may be reduced in order to protect the processor from thermal damage. This in turn reduces the computational performance of the processor, which can result in a lesser user experience; in other words, the user may perceive the HMD as "slowing down." Similarly, a refresh rate of a display driver or a frame rate of a camera may be throttled to avoid thermal damage thereto. Additionally, since the electrical efficiency of some semiconductor devices decreases with increasing temperature, operating such semiconductor devices at lower temperatures (e.g., closer to the bottom of their corresponding temperature ranges) uses less energy, thus increasing the life of a battery powering the HMD.

Accordingly, an HMD side-arm may include therein two compartments connected together by a channel. When the HMD is worn by a user, a first of the compartments may be positioned behind the user's ear, a second of the compartments may be positioned in front of the user's ear, and the channel may pass over the user's ear. The channel may be shaped to match a contour of the ear, thus making the HMD comfortable to wear. The first compartment may contain therein a battery of the HMD and the second compartment may contain therein a processor and various other heat-generating components (e.g., a power management integrated circuit). Accordingly, during operation, more heat may be generated in the second compartment than in the first compartment. Notably, in some implementations, the processor and other heat-generating components may alternatively be disposed in the first compartment, and the battery may be disposed in the second compartment.

A heat pipe may extend from the first compartment to the second compartment through the channel. The heat pipe may be configured to transfer heat between the first and second compartments. Thus, during operation, the heat pipe may transfer heat from the second compartment to the first compartment, thereby cooling the processor and other heat-generating components and warming the battery and any other components in the first compartment. Notably, transferring heat using the heat pipe between the two compartments allows a greater portion of the HMD frame to be used to cool the HMD by increasing the effective area over which heat is dissipated.

In some cases, heating the battery using energy that would otherwise be wasted may allow the battery to operate within a desired temperature range, thereby improving battery performance. For example, when ambient temperatures are low (e.g., below 50 degrees Fahrenheit), batteries generally exhibit decreased performance. However, the heat pipe may heat the battery to a higher operating temperature (e.g., 70 degrees Fahrenheit), thereby improving its performance. Additionally or alternatively, some batteries may exhibit a higher capacity on a single charge and/or an increased cycle life, among other performance benefits, when operated at higher temperatures (e.g., above 70 degrees Fahrenheit). Thus, heating such a battery inside the HMD by way of the heat pipe may maintain the temperature in the first compartment within a desired range that results in improved performance of the battery. Further, some types of batteries may be unaffected or negligibly affected by a particular increase in operating temperature (e.g., from 70 degrees Fahrenheit to 120 degrees Fahrenheit). In such cases, moving heat away from the processor toward the battery may improve performance of the processor without adversely affecting performance of the battery.

Heat transfer between the battery and the heat pipe as well as between the heat-generating components and the heat pipe may be improved by way of various conductive structures positioned therebetween. For example, because the heat pipe may have a small area of contact with the battery and/or the PCB on which the heat-generating components are disposed, conductive plates may be used to increase the effective area of contact. Namely, a first conductive plate that spans at least part of the area of the battery may be disposed between the battery and a first end of the heat pipe. Similarly, a second conductive plate that spans at least part of the area of the PCB may be disposed between the PCB and a second end of the heat pipe. Additional conductive layers (e.g., flexible sheets, gels, greases, etc.) may be used to further improve the thermal connection as well as to thermally connect to the heat pipe heat-generating components that are not on the PCB or in contact with the battery.

In addition to having heat-generating components within the second compartment, the camera, display, and display driver within the eyepiece may also generate heat. Accordingly, each of these components may be connected to a conductive subframe that spreads heat throughout the volume of the eyepiece. Further, the eyepiece may be coupled to the side-arm by way of a conductive hinge. The conductive subframe, the hinge, and the second compartment may be thermally connected, thus allowing heat from the camera, display, and display driver to be transferred to the second compartment from within which the heat pipe can further transfer and dissipate this heat along the length of the side-arm. Accordingly, thermally conductive structures may be present along a length of the HMD frame to spread transfer, and dissipate heat, generated at specific locations within the frame, along the length of the frame. Thus, temperature hot-spots are reduced and cooling of the HMD device is improved.

II. EXAMPLE WEARABLE COMPUTING DEVICES

Systems and devices in which example embodiments may be implemented will now be described in greater detail. In general, an example system may be implemented in or may take the form of a wearable computer (also referred to as a wearable computing device). In an example embodiment, a wearable computer takes the form of or includes a head-mountable device (HMD).

An example system may also be implemented in or take the form of other devices, such as a mobile phone, among other possibilities. Further, an example system may take the form of non-transitory computer readable medium, which has program instructions stored thereon that are executable by at a processor to provide the functionality described herein. An example system may also take the forth of a device such as a wearable computer or mobile phone, or a subsystem of such a device, which includes such a non-transitory computer readable medium having such program instructions stored thereon.

An HMD tray generally be any display device that is capable of being worn on the head and places a display in front of one or both eyes of the wearer. An HMD may take various forms such as a helmet or eyeglasses. As such, references to "eyeglasses" or a "glasses-style" HMD should be understood to refer to an HMD that has a glasses-like frame so that it can be worn on the head. Further, example embodiments may be implemented by or in association with an HMD with a single display or with two displays, which may be referred to as a "monocular" HMD or a "binocular" HMD, respectively.

FIG. 1A illustrates a wearable computing system according to an example embodiment. In FIG. 1A, the wearable computing system takes the form of a head-mountable device (HMD) 102 (which may also be referred to as a head-mounted display). It should be understood, however, that example systems and devices may take the form of or be implemented within or in association with other types of devices, without departing from the scope of the invention. As illustrated in FIG. 1A, the HMD 102 includes frame elements including lens-frames 104, 106 and a center frame support 108, lens elements 110, 112, and extending side-arms 114, 116. The center frame support 108 and the extending side-arms 114, 116 are configured to secure the HMD 102 to a user's face via a user's nose and ears, respectively.

Each of the frame elements 104, 106, and 108 and the extending side-arms 114, 116 may be formed of a solid structure of plastic and/or metal, or may be formed of a hollow structure of similar material so as to allow wiring and component interconnects to be internally routed through the HMD 102. Other materials may be possible as well.

One or more of each of the lens elements 110, 112 may be formed of any material that can suitably display a projected image or graphic. Each of the lens elements 110, 112 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 114, 116 may each be projections that extend away from the lens-frames 104, 106, respectively, and may be positioned behind a user's ears to secure the HMD 102 to the user. The extending side-arms 114, 116 may further secure the HMD 102 to the user by extending around a rear portion of the user's head. Additionally or alternatively, for example, the HMD 102 may connect to or be affixed within a head-mounted helmet structure. Other configurations for an HMD are also possible.

The HMD 102 may also include an on-board computing system 118, an image capture device 120, a sensor 122, and a finger-operable touch pad 124. The on-board computing system 118 is shown to be positioned on the extending side-arm 114 of the HMD 102; however, the on-board computing system 118 may be provided on other parts of the HMD 102 or may be positioned remote from the HMD 102 (e.g., the on-board computing system 118 could be wire- or wirelessly-connected to the HMD 102). The on-board computing system 118 may include a processor and memory, for example. The on-board computing system 118 may be configured to receive and analyze data from the image capture device 120 and the finger-operable touch pad 124 (and possibly from other sensory devices, user interfaces, or both) and generate images for output by the lens elements 110 and 112.

The image capture device 120 may be, for example, a camera that is configured to capture still images and/or to capture video. In the illustrated configuration, image capture device 120 is positioned on, the extending side-arm 114 of the HMD 102; however, the image capture device 120 may be provided on other parts of the HMD 102. The image capture device 120 may be configured to capture images at various resolutions or at different frame rates. Many image capture devices with a small form-factor, such as the cameras used in mobile phones or webcams, for example, may be incorporated into an example of the HMD 102.

Further, although FIG. 1A illustrates one image capture device 120, more image capture device may be used, and each may be configured to capture the same view, or to capture different views. For example, the image capture device 120 may be forward facing to capture at least a portion of the real-world view perceived by the user. This forward facing image captured by the image capture device 120 may then be used to generate an augmented reality where computer generated images appear to interact with or overlay the real-world view perceived by the user.

The sensor 122 is shown on the extending side-arm 116 of the HMD 102; however, the sensor 122 may be positioned on other parts of the HMD 102. For illustrative purposes, only one sensor 122 is shown. However, in an example embodiment, the HMD 102 may include multiple sensors. For example, an HMD 102 may include sensors such as one or more gyroscopes, one or more accelerometers, one or more magnetometers, one or more light sensors, one or more infrared sensors, and/or one or more microphones. Other sensing devices may be included in addition or in the alternative to the sensors that are specifically identified herein.

The finger-operable touch pad 124 is shown on the extending side-arm 114 of the HMD 102. However, the finger-operable touch pad 124 may be positioned on other parts of the HMD 102. Also, more than one finger-operable touch pad may be present on the HMD 102. The finger-operable touch pad 124 may be used by a user to input commands. The finger-operable touch pad 124 may sense at least one of a pressure, position and/or a movement of one or more fingers via capacitive sensing, resistance sensing, or a surface acoustic wave process, among other possibilities. The finger-operable touch pad 124 may be capable of sensing movement of one or more fingers simultaneously, in addition to sensing movement in a direction parallel or planar to the pad surface, in a direction normal to the pad surface, or both, and may also be capable of sensing a level of pressure applied to the touch pad surface. In some embodiments, the finger-operable touch pad 124 may be formed of one or more translucent or transparent insulating layers and one or more translucent or transparent conducting layers. Edges of the finger-operable touch pad 124 may be formed to have a raised, indented, or roughened surface, so as to provide tactile feedback to a user when the user's finger reaches the edge, or other area, of the finger-operable touch pad 124. If more than one finger-operable touch pad is present, each finger-operable touch pad may be operated independently, and may provide a different function.

In a further aspect, HMD 102 may be configured to receive user input in various ways, in addition or in the alternative to user input received via finger-operable touch pad 124. For example, on-board computing system 118 may implement a speech-to-text process and utilize a syntax that maps certain spoken commands to certain actions. In addition, HMD 102 may include one or more microphones via which a wearer's speech may be captured. Configured as such, HMD 102 may be operable to detect spoken commands and carry out various computing functions that correspond to the spoken commands.

As another example, HMD 102 may interpret certain head-movements as user input. For example, when HMD 102 is worn, HMD 102 may use one or more gyroscopes and/or one or more accelerometers to detect head movement. The HMD 102 may then interpret certain head-movements as being user input, such as nodding, or looking up, down, left, or right. An HMD 102 could also pan or scroll through graphics in a display according to movement. Other types of actions may also be mapped to head movement.

As yet another example, HMD 102 may interpret certain gestures (e.g., by a wearer's hand or hands) as user input. For example, HMD 102 may capture hand movements by analyzing image data from image capture device 120, and initiate actions that are defined as corresponding to certain hand movements.

As a further example, HMD 102 may interpret eye movement as user input. In particular, HMD 102 may include one or more inward-facing image capture devices and/or one or more other inward-facing sensors (not shown) sense a user's eye movements and/or positioning. As such, certain eye movements may be mapped to certain actions. For example, certain actions may be defined as corresponding to movement of the eye in a certain direction, a blink, and/or a wink, among other possibilities.

HMD 102 also includes a speaker 125 for generating audio output. In one example, the speaker could be in the form of a bone conduction speaker, also referred to as a bone conduction transducer (BCT). Speaker 125 may be, for example, a vibration transducer or an electroacoustic transducer that produces sound in response to an electrical audio signal input. The frame of HMD 102 may be designed such that when a user wears HMD 102, the speaker 125 contacts the wearer. Alternatively, speaker 125 may be embedded within the frame of HMD 102 and positioned such that, when the HMD 102 is worn, speaker 125 vibrates a portion of the frame that contacts the wearer. In either case, HMD 102 may be configured to send an audio signal to speaker 125, so that vibration of the speaker may be directly or indirectly transferred to the bone structure of the wearer. When the vibrations travel through the bone structure to the bones in the middle ear of the wearer, the wearer can interpret the vibrations provided by BCT 125 as sounds.

Various types of bone-conduction transducers (BCTs) may be implemented, depending upon the particular implementation. Generally, any component that is arranged to vibrate the HMD 102 may be incorporated as a vibration transducer. Yet further it should be understood that an HMD 102 may include a single speaker 125 or multiple speakers. In addition, the location(s) of speaker(s) on the HMD may vary, depending upon the implementation. For example, a speaker may be located proximate to a wearer's temple (as shown), behind the wearer's ear, proximate to the wearer's nose, and/or at any other location where the speaker 125 can vibrate the wearer's bone structure.

Figure 1B:
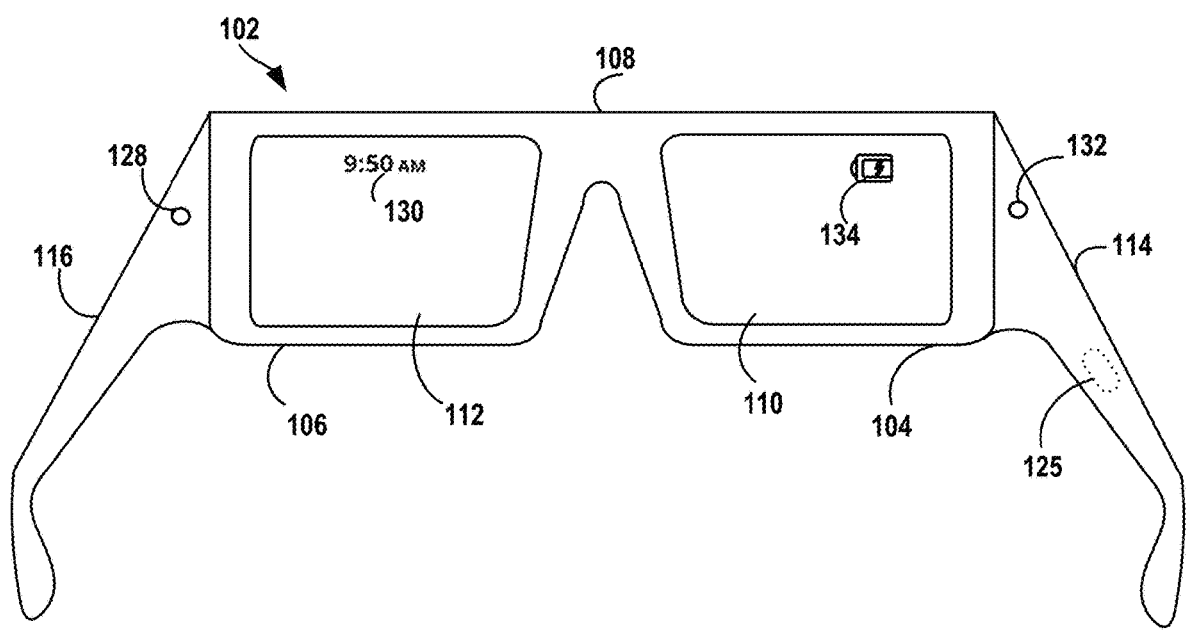
FIG. 1B illustrates an alternate view of the wearable computing device illustrated in FIG. 1A, in accordance with example embodiments.

FIG. 1B illustrates an alternate view of the wearable computing device illustrated in FIG. 1A. As shown in FIG. 1B, the lens elements 110, 112 may act as display elements. The HMD 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 134 onto an inside surface of the lens element 110.

The lens elements 110, 112 may act as a combiner in a light projection system and may include a coating that reflects the light projected onto them from the projectors 128, 132. In some embodiments, a reflective coating may not be used (e.g., when the projectors 128, 132 are scanning laser devices).

In alternative embodiments, other types of display elements may also be used. For example, the lens elements 110, 112 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 104, 106 for driving such a matrix display. Alternatively or additionally, a laser or LED source and scanning system could be used to draw a raster display directly onto the retina of one or more of the user's eyes. Other possibilities exist as well.

Figure 1C:
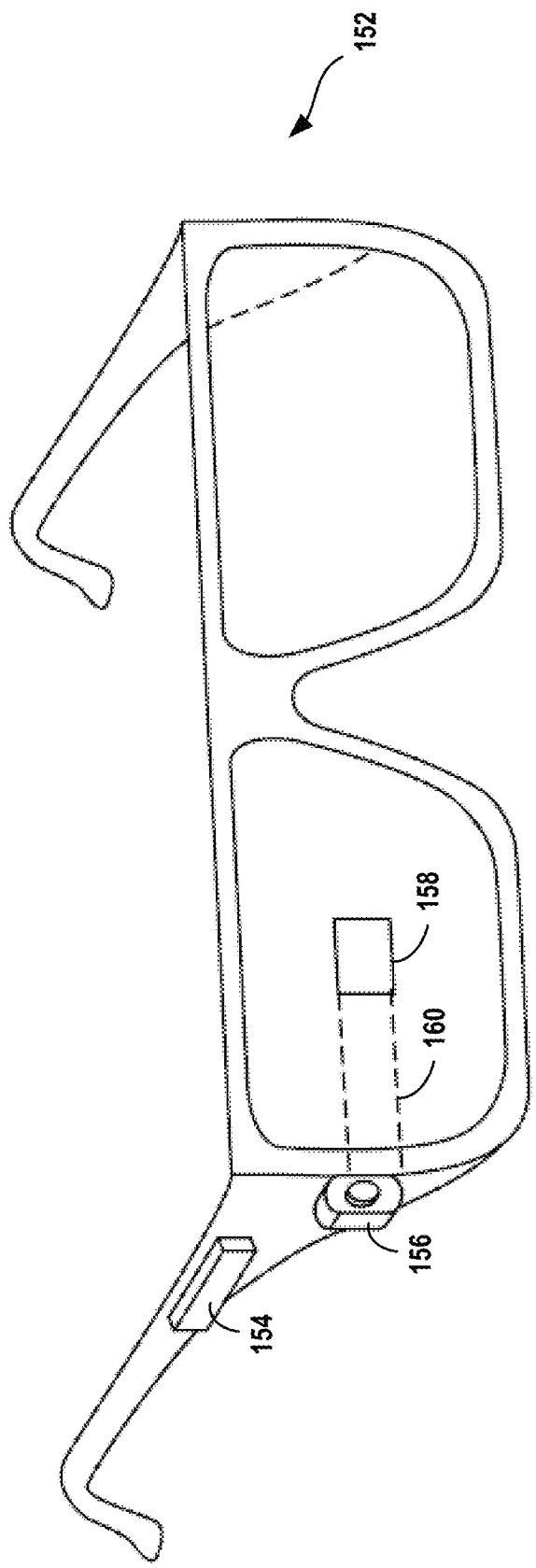
FIG. 1C illustrates another wearable computing system, in accordance with example embodiments.

FIG. 1C illustrates another wearable computing system according to an example embodiment, which takes the form of an HMD 152. The HMD 152 may include frame elements and side-arms such as those described with respect to FIGS. 1A and 1B. The HMD 152 may additionally include an on-board computing system 154 and an image capture device 156, such as those described with respect to FIGS. 1A and 1B. The image capture device 156 is shown mounted on a frame of the HMD 152. However, the image capture device 156 may be mounted at other positions as well, or may be embedded into or otherwise attached to the frame.

As shown in FIG. 1C, the HMD 152 may include a single display 158 which may be coupled to the device. The display 158 may be formed on one of the lens dements of the HMD 152, such as a lens element described with respect to FIGS. 1A and 1B, and may be configured to overlay computer-generated graphics in the user's view of the physical world. The display 158 is shown to be provided in a center of a lens of the HMD 152, however, the display 158 may be provided in other positions, such as for example towards either the upper or lower portions of the wearer's field of view. The display 158 is controllable via the computing system 154 that is coupled to the display 158 via an optical waveguide 160.

Figure 1D:
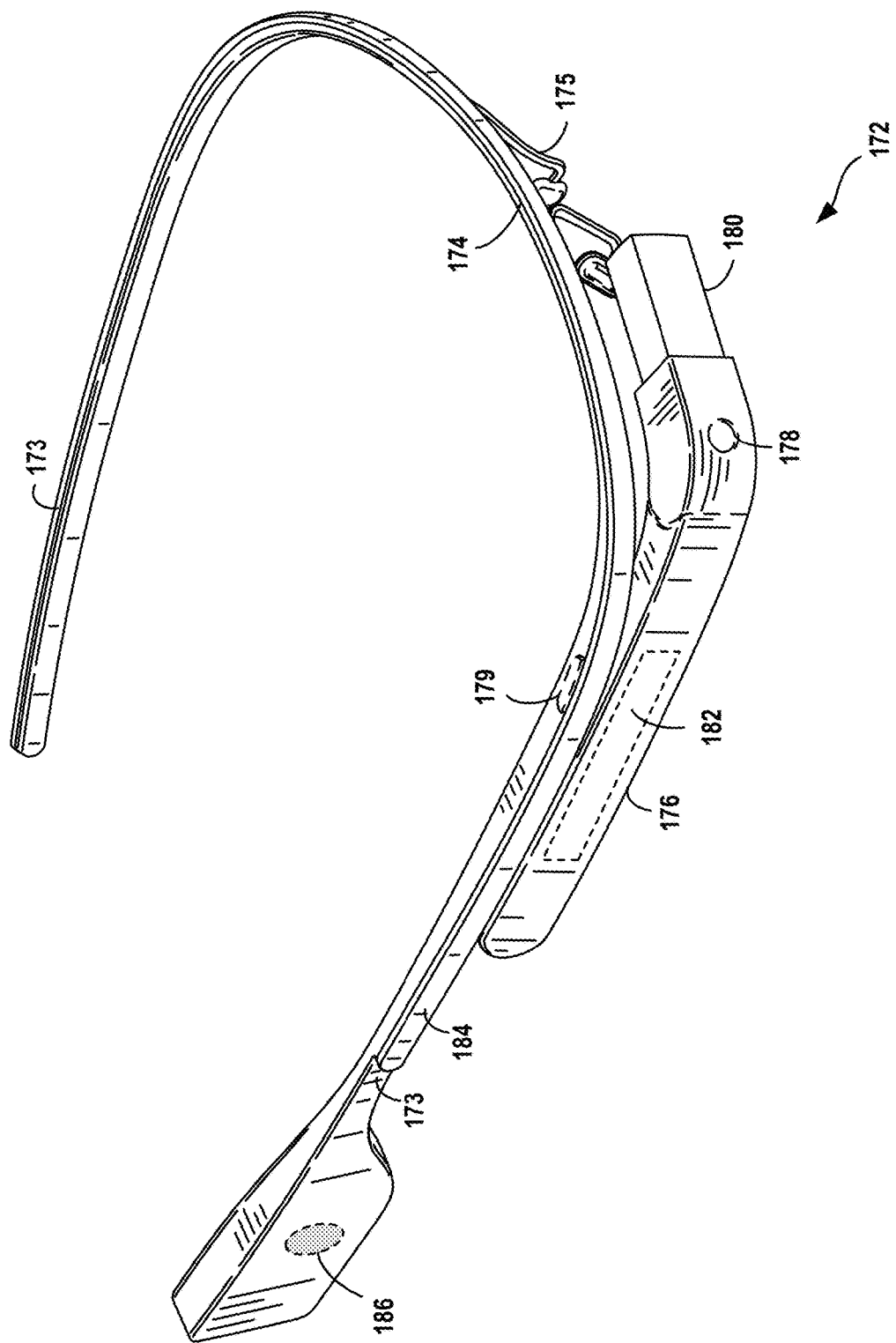
FIG. 1D illustrates a further wearable computing system, in accordance with example embodiments.

FIG. 1D illustrates another wearable computing system according to an example embodiment, which takes the form of a monocular HMD 172. The HMD 172 may include side-arms 173, a center frame support 174, and abridge portion with nosepiece 175. In the example shown in FIG. 1D, the center frame support 174 connects the side-arms 173. The HMD 172 does not include lens-frames containing lens elements. The HMD 172 may additionally include a component housing 176, which may include an on-board computing system (not shown), an image capture device 178, and a button 179 for operating the image capture device 178 (and/or usable for other purposes). Component housing 176 may also include other electrical components and/or may be electrically connected to electrical components at other locations within or on the HMD. HMD 172 also includes a BCT 186.

The HMD 172 may include a single display 180, which may be coupled to one of the side-arms 173 via the component housing 176. (Embodiments with a second display for the other eye are also possible.) In an example embodiment, the display 180 may be a see-through display, which is made of glass and/or another transparent or translucent material, such that the wearer can see their environment through the display 180. Further, the component housing 176 may include the light sources (not shown) for the display 180 and/or optical elements (not shown) to direct light from the light sources to the display 180. As such, display 180 may include optical features that direct light that is generated by such light sources towards the wearer's eye, when HMD 172 is being worn.

In a further aspect, HMD 172 may include a sliding feature 184, which may be used to adjust the length of the side-arms 173. Thus, sliding feature 184 may be used to adjust the fit of HMD 172. Further, an HMD may include other features that allow a wearer to adjust the fit of the HMD, without departing from the scope of the invention. HMD 172 may additionally include finger-operable touchpad 182.

Figure 1E:
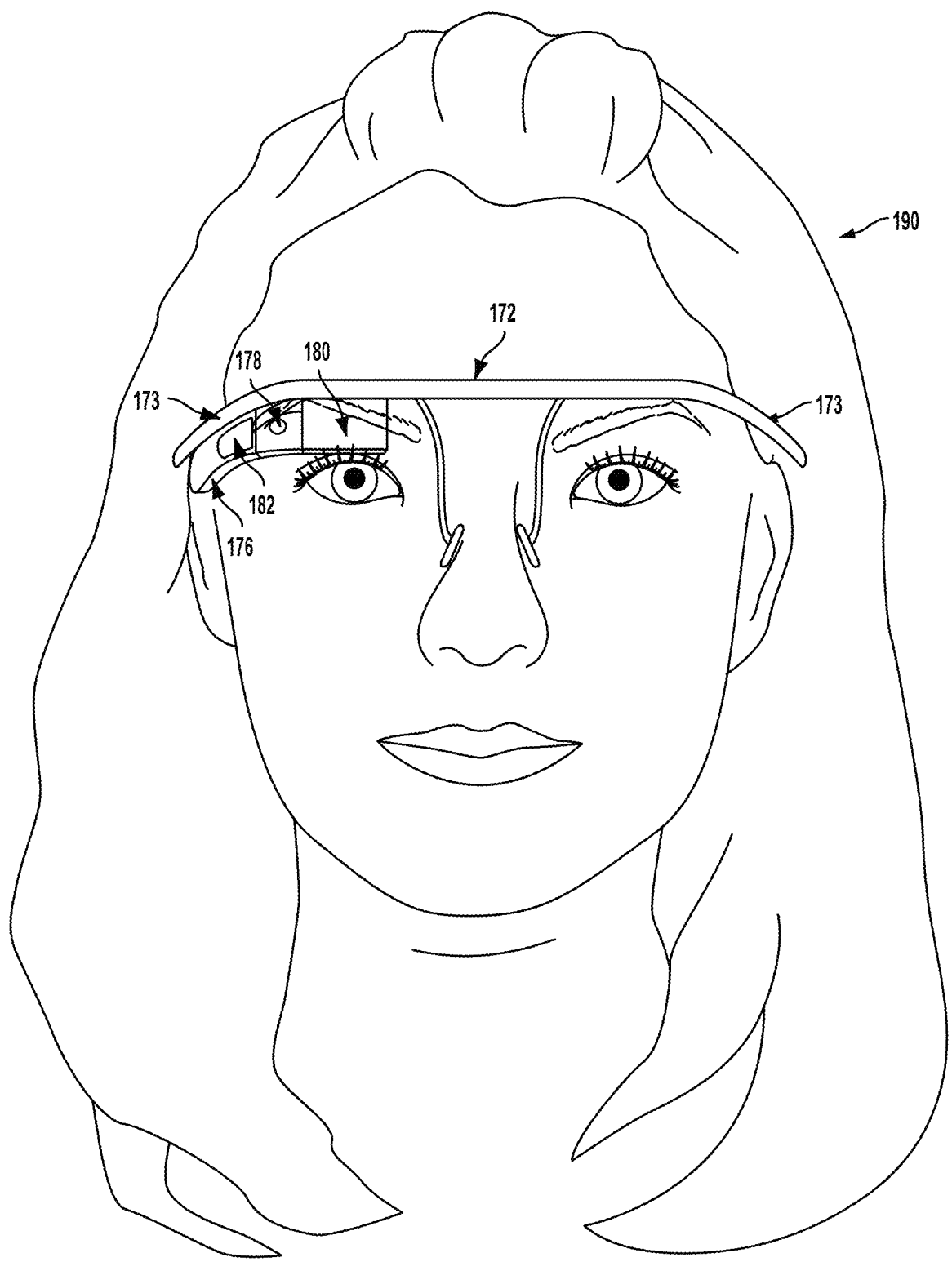
FIGS. 1E, 1F, and 1G illustrate the wearable computing system shown in FIG. 1D being worn by a wearer, in accordance with example embodiments.
Figure 1F:
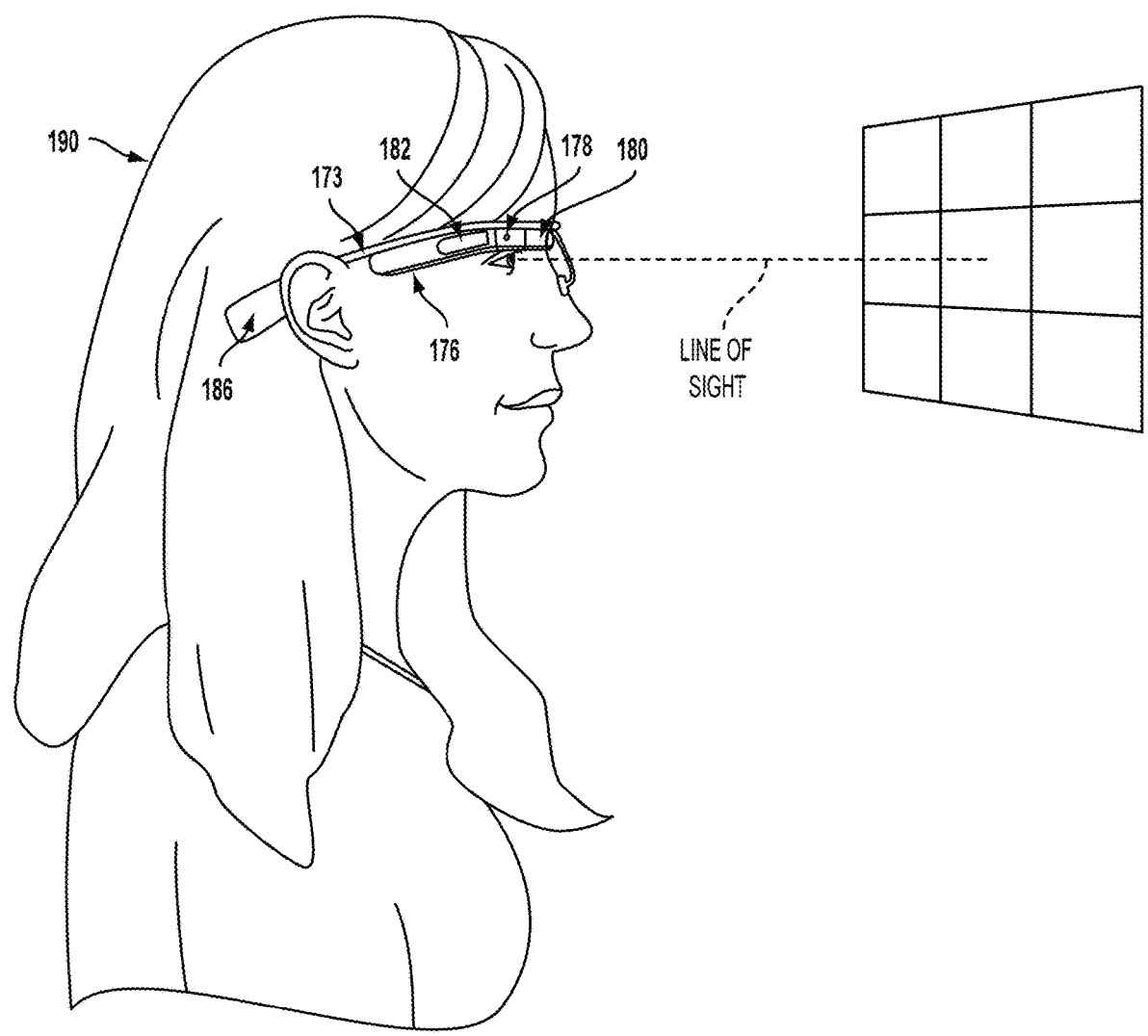
Figure 1G:
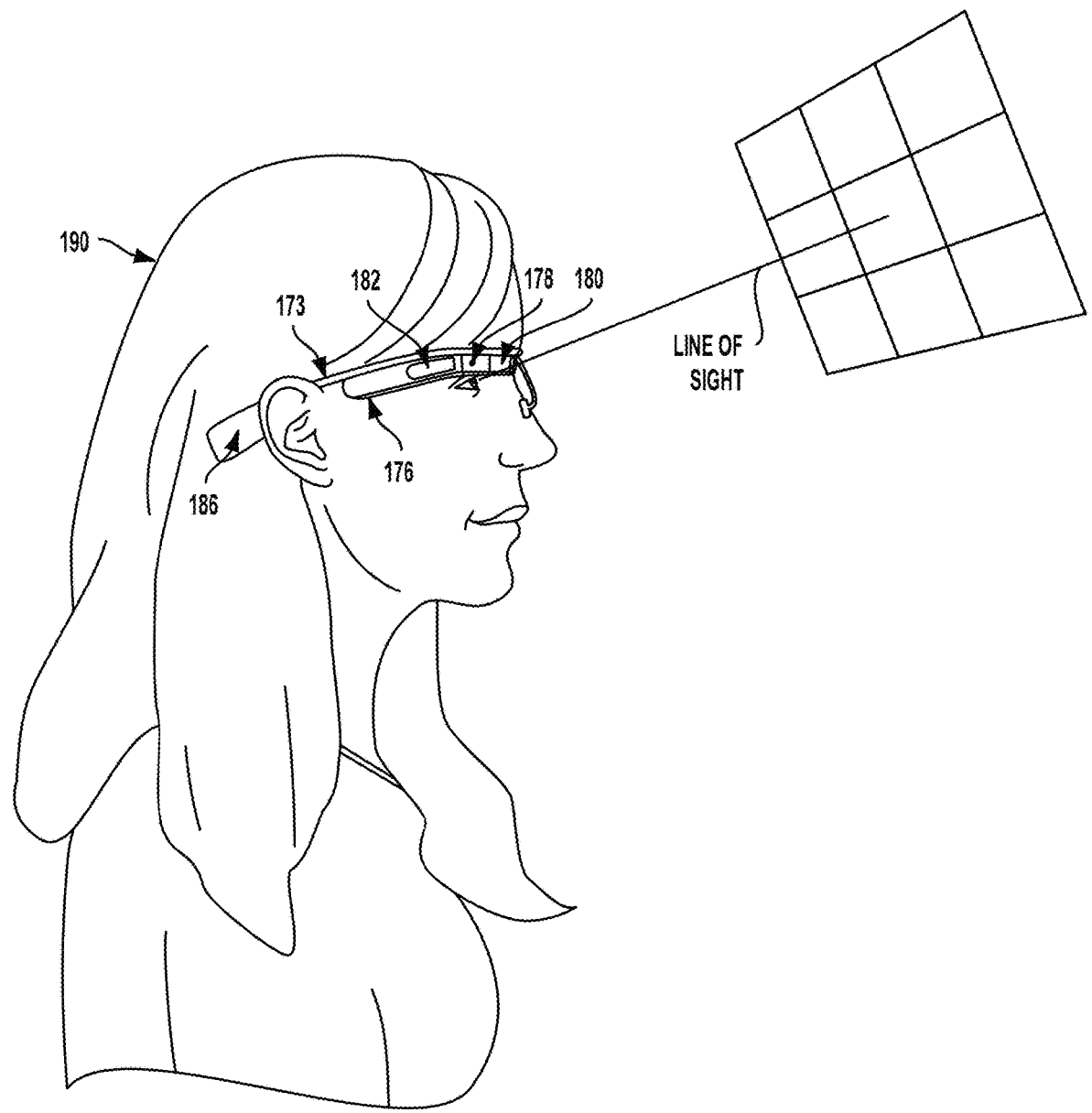

FIGS. 1E to 1G are simplified illustrations of the HMD 172 shown in FIG. 1D, being worn by a wearer 190. As shown in FIG. 1F, when HMD 172 is worn, BCT 186 is arranged such that when HMD 172 is worn, BCT 186 is located behind the wearer's ear. As such, BCT 186 is not visible from the perspective shown in FIG. 1E.

In the illustrated example, the display 180 may be arranged such that when HMD 172 is worn, display 180 is positioned in front of or proximate to a user's eye when the HMD 172 is worn by a user. For example, display 180 may be positioned below the center frame support and above the center of the wearer's eye, as shown in FIG. 1E. Further, in the illustrated configuration, display 180 may be offset from the center of the wearer's eye (e.g., so that the center of display 180 is positioned to the right and above of the center of the wearer's eye, from the wearer's perspective).

Configured as shown in FIGS. 1E to 1G, display 180 may be located in the periphery of the field of view of the wearer 190, when HMD 172 is worn. Thus, as shown by FIG. 1F, when the wearer 190 looks forward, the wearer 190 may see the display 180 with their peripheral vision. As a result, display 180 may be outside the central portion of the wearer's field of view when their eye is facing forward, as it commonly is for many day-to-day activities. Such positioning can facilitate unobstructed eye-to-eye conversations with others as well as generally providing unobstructed viewing and perception of the world within the central portion of the wearer's field of view. Further, when the display 180 is located as shown, the wearer 190 may view the display 180 by, e.g., looking up with their eyes only (possibly without moving their head). This is illustrated as shown in FIG. 1G, where the wearer has moved their eyes to look up and align their line of sight with display 180. A wearer might also use the display by tilting their head down and aligning their eye with the display 180.

Figure 2:
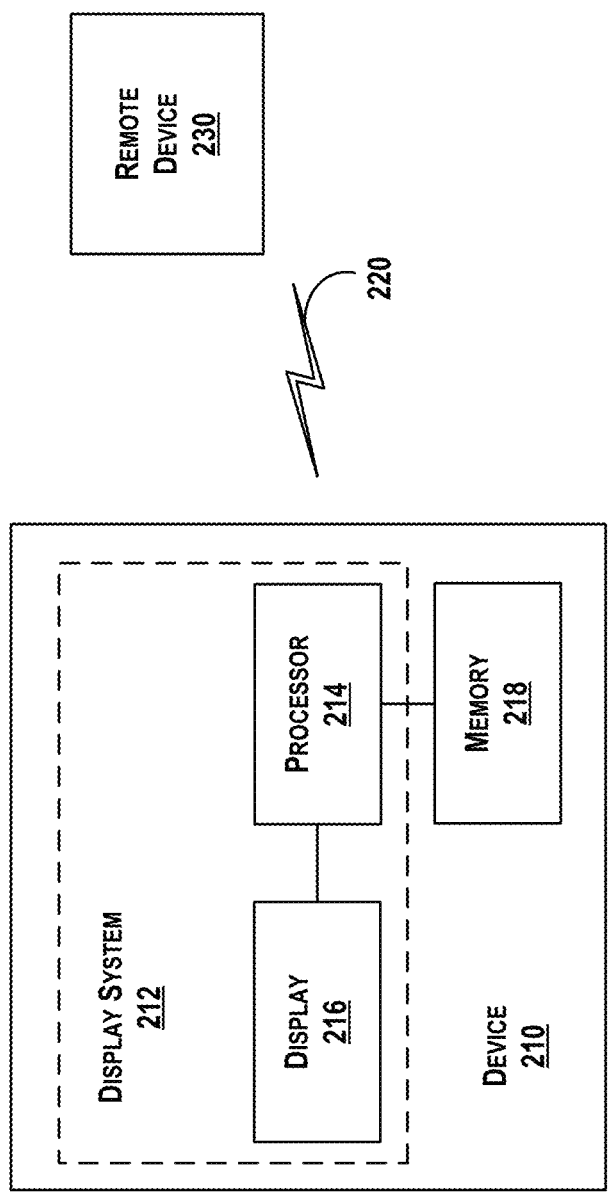
FIG. 2 illustrates a block diagram of a computing device, in accordance with example embodiments.

FIG. 2A is a simplified block diagram of a computing device 210 according to an example embodiment. The device 210 may be any type of device that can receive data and display information corresponding to or associated with the data. For example, the device 210 may take the form of or include a head-mountable display, such as the head-mounted devices 102, 152, or 172 that are described with reference to FIGS. 1A to 1G. The device 210 could also take the form of other types of wearable devices, such as watch-style (e.g., wrist-mounted) wearable device, or a clip-on device that can be attached to the body or to clothing, among other possibilities.

The device 210 may include display system 212 that includes processor 214 and display 216. The display 216 may be, for example, an optical see-through display, an optical see-around display, or a video see-through display. The processor 214 may receive data from the remote device 230, and configure the data for display on the display 216. The processor 214 may be any type of processor, such as a micro-processor or a digital signal processor, for example.

The device 210 may further include on-board data storage, such as memory 218 coupled to the processor 214. The memory 218 may store software that can be accessed and executed by the processor 214, for example.

In an example embodiment, device 210 communicates using a communication link 220 (e.g., a wired or wireless connection) to a remote device 230. The remote device 230 may be any type of computing device or transmitter including a laptop computer, a mobile telephone, head-mountable display, tablet computing device, etc., that is configured to transmit data to the device 210. The remote device 230 and the device 210 may contain hardware to enable the communication link 220, such as processors, transmitters, receivers, antennas, etc.

Further, remote device 230 may take the form of or be implemented in a computing system that is in communication with and configured to perform functions on behalf of client device, such as computing device 210. Such a remote device 230 may receive data from another computing device 210 (e.g., an HMD 102, 152, or 172 or a mobile phone), perform certain processing functions on behalf of the device 210, and then send the resulting data back to device 210. This functionality may be referred to as "cloud" computing.

In FIG. 2A, the communication link 220 is illustrated as a wireless connection; however, wired connections may also be used. For example, the communication link 220 may be a wired, serial bus such as a universal serial bus or a parallel bus. A wired connection may be a proprietary connection as well. The communication link 220 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. The remote device 230 may be accessible via the Internet and may include a computing cluster associated with a particular web service (e.g., social-networking, photo sharing; address book, etc.).

III. EXAMPLE HEAT PIPE FOR A WEARABLE COMPUTING DEVICE

Figure 3A:
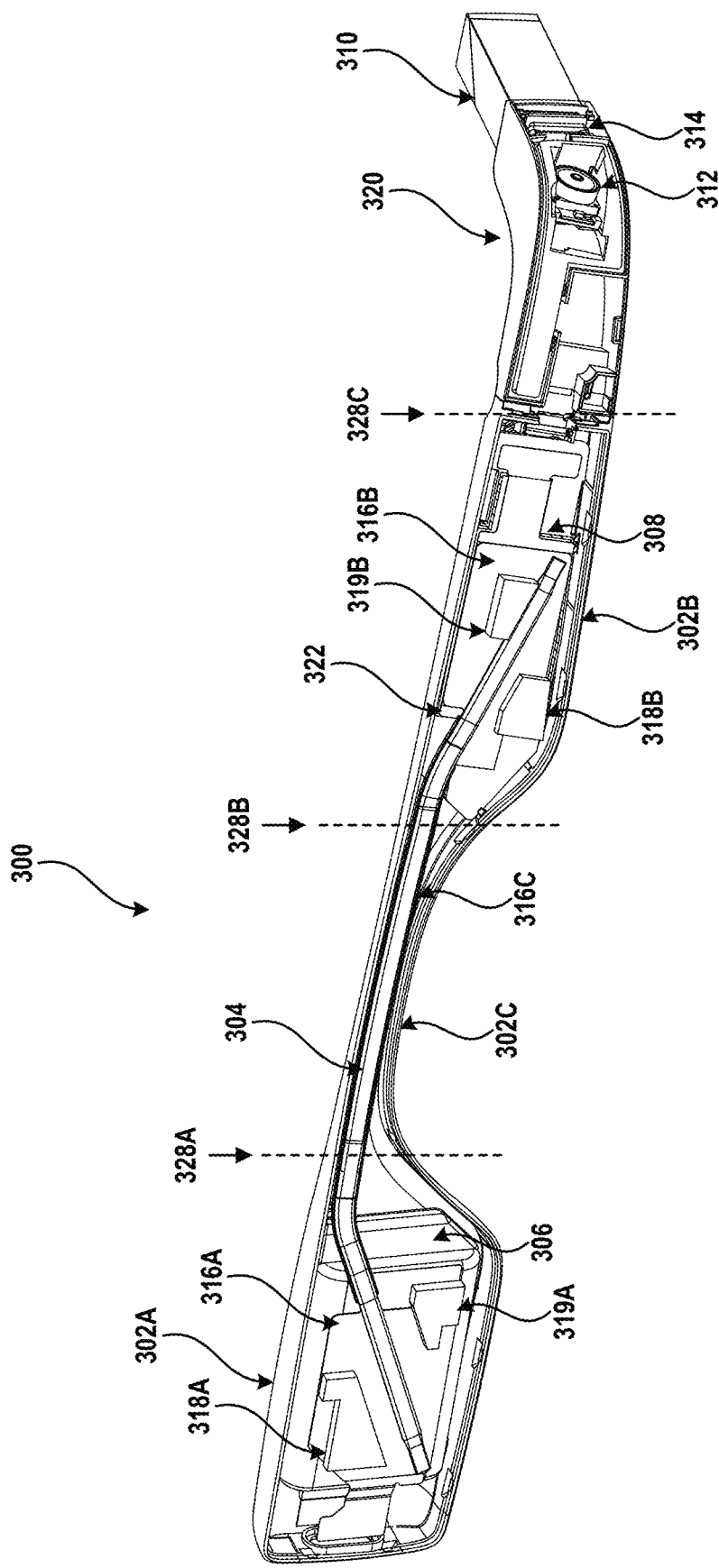
FIGS. 3A, 3B, and 3C illustrate different views of a heat pipe within a wearable computing system, in accordance with example embodiments.
Figure 3B:
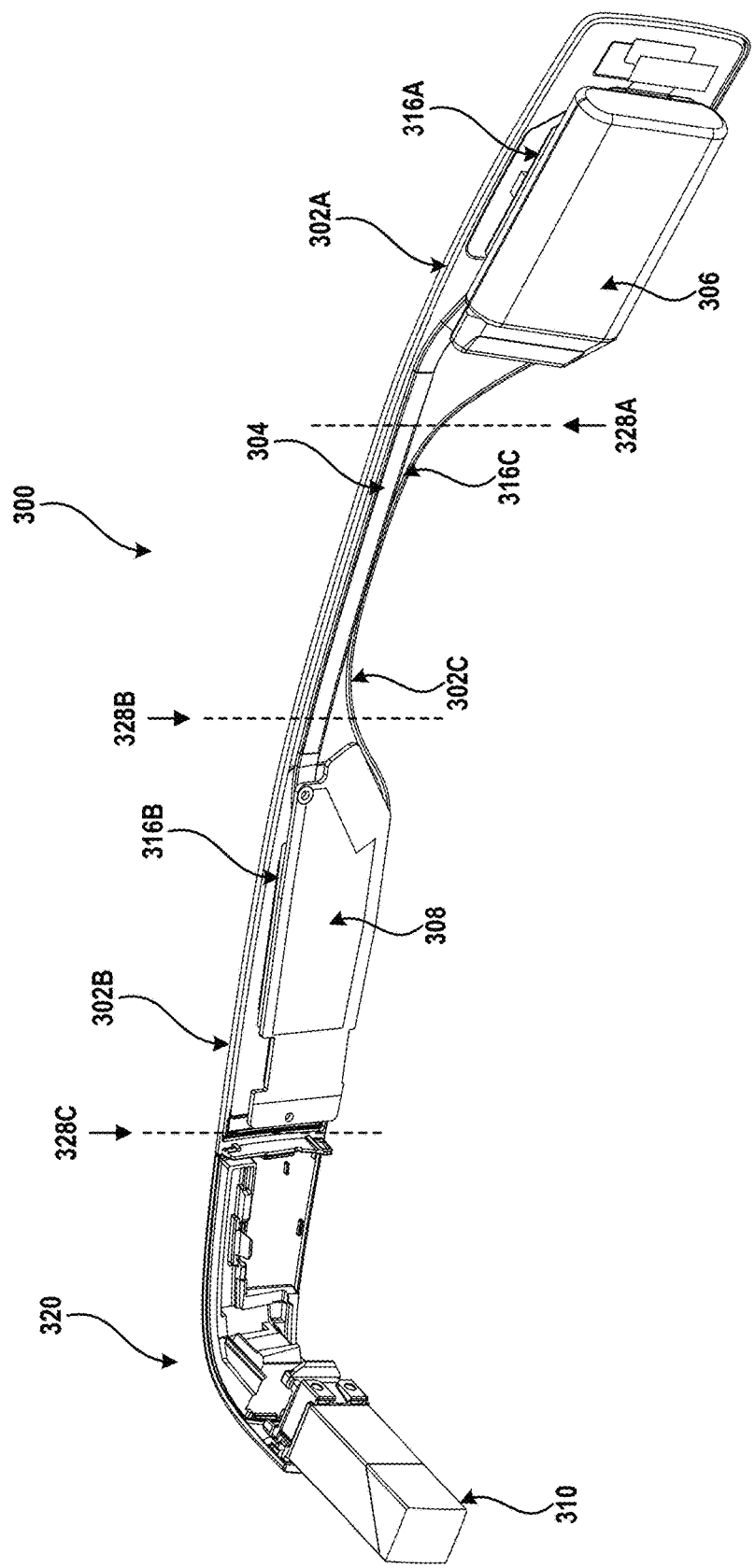
Figure 3C:
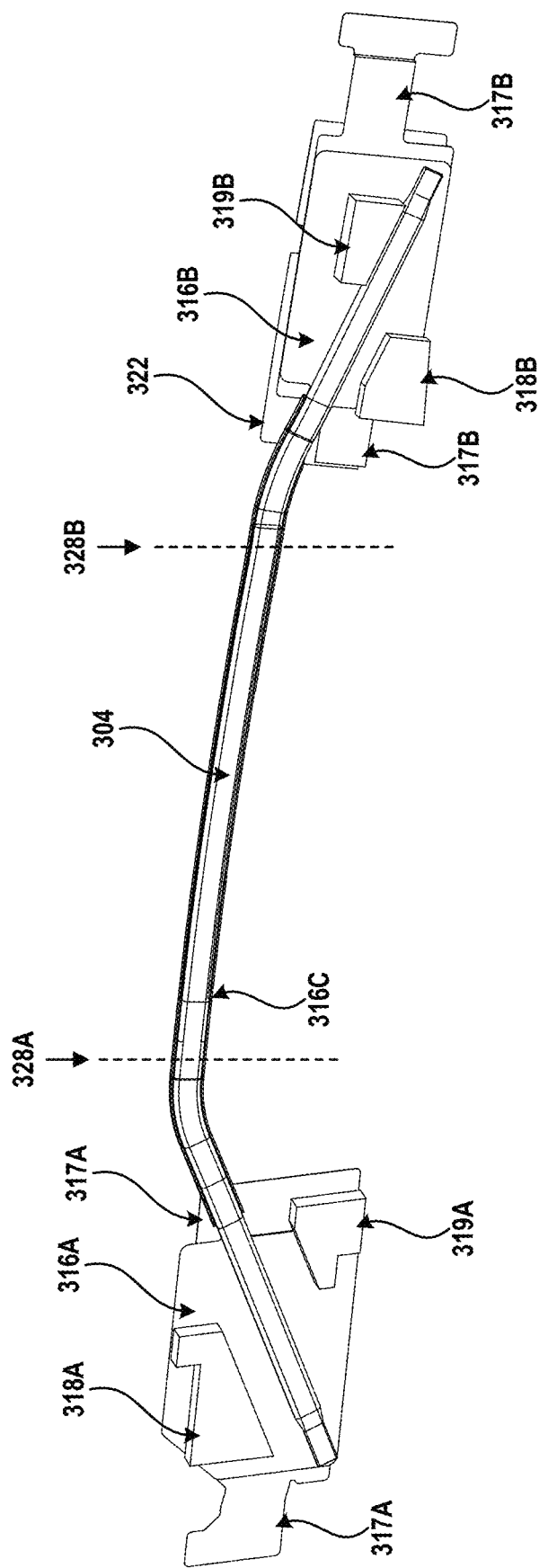

FIGS. 3A, 3B, and 3C illustrate different views of a heat pipe disposed within an HMD. Specifically, FIG. 3A shows the part of the HMD from a first side (outside of the HMD), FIG. 3B shows part of the HMD from a second side (inside of the HMD), and FIG. 3C shows the heat pipe, without the HMD, from the first side. The HMD includes a frame component 300 (i.e., a side-arm) and eyepiece 320 connected thereto by way of a hinge. Eyepiece 320 includes image capture device 312, display 310 and display driver 314. Dashed line 328C is drawn to show the separation between eyepiece 320 and frame component 300. Frame component 300 is configured to rest one the side of a head of a user, thereby positioning eyepiece 320 in front of an eye of the user.

Frame component 300 includes therein first compartment 302A, second compartment 302B, and channel 302C connecting first compartment 302A to second compartment 302B. Dashed line 328A approximately delineates the boundary between first compartment 302A and channel 302C. Similarly, dashed line 328B approximately delineates the boundary between second compartment 302B and channel 302C. Compartments 302A and 302B may be separate sections or volumes of frame component 300 in which respective components of the HMD are housed.

When worn by a user, the portion of frame component 300 that defines channel 302C is configured to rest above or pass over an ear of the user, the portion of frame component 300 that defines compartment 302A is configured to be positioned posterior to the ear, and the portion of frame component 300 that defines compartment 302B is configured to be positioned anterior to the ear. To that end, compartments 302A and 302B are larger (e.g., have a greater height) than channel 302C. Accordingly, channel 302C gradually transitions, opens up, or widens out into first compartment 302A on the left and second compartment 302B on the right, creating a contour that secures frame component 300 on top of the wearer's ear.

First compartment 302A has disposed therein battery 306, among other components. Second compartment 302B has disposed therein printed circuit board (PCB) 308 that includes thereon a processor and various other electronic components (collectively referred to as processing components) such as, for example, memory, communication modules, power management modules, or other processors (e.g., application-specific integrated circuits). Notably, in some implementations, some of the components of first compartment 302A may instead be disposed in second compartment 302B, and vice versa.

The processing components generate heat during operation. In order to cool the processing components, heat pipe 304 is provided to transfer heat from second compartment 302B to first compartment 302A. Battery 306 disposed within first compartment 302A is thus heated by heat pipe 304 when the processing components on PCB 308 generate heat.

Notably, the processing components may be configured to operate at temperatures under a maximum temperature threshold value. When the temperature rises above the maximum temperature threshold value, the processing components may become damaged. Thus to prevent damage, each processing components may be protected from overheating by being configured to perform fewer operations (e.g., by way of dynamic frequency scaling) or stop operating altogether in response to the temperature rising above a safety temperature threshold (which may be lower than the maximum temperature threshold). Accordingly, when the rate at which the processing components generate heat is greater than a rate at which heat can be dissipated from these components, the temperature of the components increases, resulting in decreased computational performance. The small size of frame component 300 and the dense packaging of components therein may decrease the rate of heat dissipation from around the processing components.

Accordingly, heat pipe 304 is provided to improve the rate at which heat can be dissipated from around the processing components. Heat pipe 304 transfers the heat generated by the processing components from second compartment 302B to first compartment 302A, which may have a greater volume and surface area than second compartment 302B, thus allowing for a higher rate of heat dissipation from the processing components through frame component 300. Additionally, the heat is transferred through channel 302C which provides further surface area across which heat can be dissipated.

The heat generated by the processing components on PCB 308 may be used to maintain battery 306 within a desired operating temperature range. For example, some types of batteries may perform better (e.g., exhibit a higher capacity on a single charge, have a longer cycle life, deliver a higher peak current, etc.) when operated within higher temperature ranges (e.g., temperatures that exceed the room temperature range of 65-75 degrees Fahrenheit). Such batteries may benefit from heat pipe 304 maintaining first compartment 302A at a higher temperature than would otherwise be achieved without heat pipe 304. Additionally, many batteries exhibit decreased performance when used in an environment with a low ambient temperature (e.g., 15-40 degrees Fahrenheit). In such circumstances, heat pipe 304 may raise the temperature within first compartment 302A to a more suitable operating temperature range (e.g., above 60 degrees Fahrenheit). Thus, waste heat generated by processing components, rather than simply being dissipated, may be repurposed to create more desirable operating conditions for battery 306, thereby improving its performance.

Further, some batteries while they might not benefit from a high operating temperature (e.g., 80 degrees Fahrenheit to 140 degrees Fahrenheit), may nevertheless be capable of operating at such temperatures with little to no adverse effects. Accordingly, processing components in second compartment 302B may be cooled without adversely affecting performance of battery 306, thereby generating a net positive effect on the performance of the HMD as a whole. Heat pipe 304 may thus improve performance of the HMD by (i) allowing the processing components to perform operations at higher frequency due to improved cooling, (ii) allowing the processing components to use less energy due to operating at lower temperatures, and/or (iii) improving performance of battery 306 by maintaining battery 306 within a desired temperature range.

Heat pipe 304 includes a first section disposed within first compartment 302A, a second section disposed within second compartment 302B, and a third section disposed within channel 302C. The divisions between the different sections of heat pipe 304 are approximately indicated by dashed lines 328A and 328B, which are provided for clarity of description and illustration and do not indicate a physical discontinuity in heat pipe 304 or frame component 300. The first section of heat pipe 304 is angled left and downwards relative to the third section to diagonally span battery 306 and most of first compartment 302A, thereby dissipating heat across a large portion of battery 306 and first compartment 302A. Similarly, the second section of heat pipe 304 is angled right and downwards relative to the third section to diagonally span PCB 308 and most of compartment 302B, thereby absorbing heat from a large portion of PCB 308 and second compartment 302B. In some implementations, the first and second sections may alternatively be coiled or otherwise arranged to span and expose heat pipe 304 to additional areas of battery 306 and PCB 308, respectively, thereby improving heat transfer.

Heat pipe 304 is made up of a conductive material (e.g., copper, aluminum) arranged to define a channel or envelope along a length of the heat pipe. The channel, referred to as a second channel for clarity, may have a cross-section that is, for example, oval, rectangular, or elliptical, among other possibilities. The size and shape of the second channel cross section may be configured to fit within channel 302C. A wicking structure (e.g., sintered metal powder, grooves, or metal mesh) may be disposed circumferentially along the inner boundary of the second channel. The second channel may be filled with a fluid. The conductive material making up the heat pipe and the wicking structure may be selected to be compatible (e.g., non-reactive) with the fluid.

The fluid may be configured to be vaporized by heat absorbed at one end of the heat pipe. The vaporized fluid may travel along a length of the second channel to a second end of the heat pipe where heat from the vaporized fluid is dissipated, thereby causing the fluid to condense. The condensed fluid may subsequently be transferred back to the first end of the heat pipe by way of the wicking structure. The wicking structure may allow the fluid to move through the heat pipe via capillary action. The fluid may be continuously recirculated through the heat pipe to transfer heat from a hot side thereof to a cold side thereof. An example heat pipe may have a thermal conductivity of 2500 W/m-K to 3500 W/m-K.

The heat pipe described above may be referred to as a constant conductance heat pipe. However, in some implementations, other types of heat pipes or aspects thereof may be used instead. For example, heat pipe 304 may be or may include aspects of vapor chambers (i.e., planar heat pipes), variable conductance heat pipes, pressure controlled heat pipes, diode heat pipes, thermosiphons, or rotating heat pipes, among other possibilities.

Heat pipe 304 may be thermally connected to battery 306 at the first end thereof and to PCB 308 at the second end thereof. The thermal connection may be created in part by a thermal grease or gel disposed between heat pipe 304 and PCB 308 (or one or more components therebetween) as well as between heat pipe 304 and battery 306 (or one or more components therebetween). The thermal connection may further be improved by the placement of first conductive plate 316A between the first section of heat pipe 304 and battery 306 and second conductive plate 316B between the second section of heat pipe 304 and PCB 308. Conductive plates 316A and 316B may be generally planar structures with features such as indentations, impressions, or notches that correspond to the structures with which the plates are configured to interface.

First conductive plate 316A may, by spanning the area of one side of battery 306 or a portion thereof, effectively increase the area over which the first section of heat pipe 304 dissipates heat to battery 306. Similarly, second conductive plate 316B may, by spanning the area of one side of PCB 308 or a portion thereof, effectively increase the area over which the second section of heat pipe 304 absorbs heat from PCB 308.

Conductive plates 316A and 316B may, in some implementations, be connected by conductive strip 316C that runs through channel 302C alongside heat pipe 304 to further improve the transfer of heat and provide rigidity to frame component 300. Conductive plates 316A and 316B and conductive strip 316C may be made out of copper, aluminum, graphite, or another conductive material.

The conductive plates may additionally include thereon conductive protrusions that operate to spread heat away from a side of frame component 300 that will be in contact with the head of the user. Namely, conductive plate 316A includes thereon conductive features 318A and 319A (e.g., conductive protrusions) that protrude perpendicularly therefrom in a direction opposite to the head of the user. Similarly, conductive plate 316B includes thereon conductive features 318B and 319B (e.g., conductive protrusions) that protrude perpendicularly therefrom in a direction opposite to the head of the user. The outside portion of frame component 300 (shown in FIG. 3B, hidden in FIG. 3A) includes therein openings to accommodate each of features 318A, 319A, 318B, and 319B. Features 318A, 319A, 318B, and 319B thus spread heat to the periphery of the outer portion (i.e., the portion not in contact with the head of the user) of frame component 300, thereby improving heat dissipation from frame component 300.

In some implementations, additional conductive structures (e.g., thermal interface layers) may be included to assist in the transfer of heat to and from heat pipe 304. These conductive structures may be solids or semi-solids (e.g., thermal gels or greases). For example, conductive layers 317A and 317B may be included within first compartment 302A and second compartment 302B, respectively Conductive layers 317A and 317B may be flexible or pliable and thus configured to conform to variations in surface texture or shape of the components within each compartment, thus improving heat transfer to and from conducive plates 316A and 316B. That is, conductive layers 317A and 317B may operate as a type of compressible gasket between processing components and conductive plates 316A and 316B. Thus, conductive layers 317A and 317B may bend or twist to create a thermal connection between various components and conductive plates 316A and 316B, respectively, that would otherwise be insulated therefrom. For example, conductive layers 317A and 317B might extend to components that conductive plates 316A and 316B might not reach due to these components being positioned out of plane of the conductive plates or in other difficult to reach areas of the respective compartments.

In one example, conductive plate 316B may form part of a conductive container or housing that wholly or partly surrounds the processing components. Namely, the processing components may be disposed inside the conductive container and thermally connected to a first side of conductive plate 316B by a first thermal interface material. A second side of conductive plate 316B may in turn be thermally connected to heat pipe 304 by way of a second thermal interface material (e.g., conductive layer 317B) applied to the outside of the conductive container.

Second compartment 302B of frame component 300 may also include therein insulating plate 322. Insulating plate 322 may be disposed between PCB 308 and the side of frame component 300 that is in contact with the head of the user when worn. Accordingly, insulating plate 322 may operate to insulate the user's head from heat generated by electrical components on PCB 308, thus improving user comfort when wearing the HMD. Insulating plate 322 may direct heat generated by electrical components on PCB 308 towards the outside of frame component 300 such that it is absorbed and transferred by heat pipe 304 and spread outwards by conductive features 318B and 319B. Notably, first compartment 302A might not include a similar insulating plate since the portion of first compartment 302A facing the user's head might not be in contact therewith. Thus, frame component 300 may be able to dissipate heat in all directions through first compartment 302A. Nevertheless, in some cases, an insulating plate may also be included in first compartment 302A or a portion thereof (e.g., when a portion thereof is in contact with a side of the head). Additionally, in some implementations, a similar insulating strip may also be disposed within channel 302C between heat pipe 304 and the side of frame component 300 in contact with the head, thus insulating the head from heat pipe 304.

Figure 4:
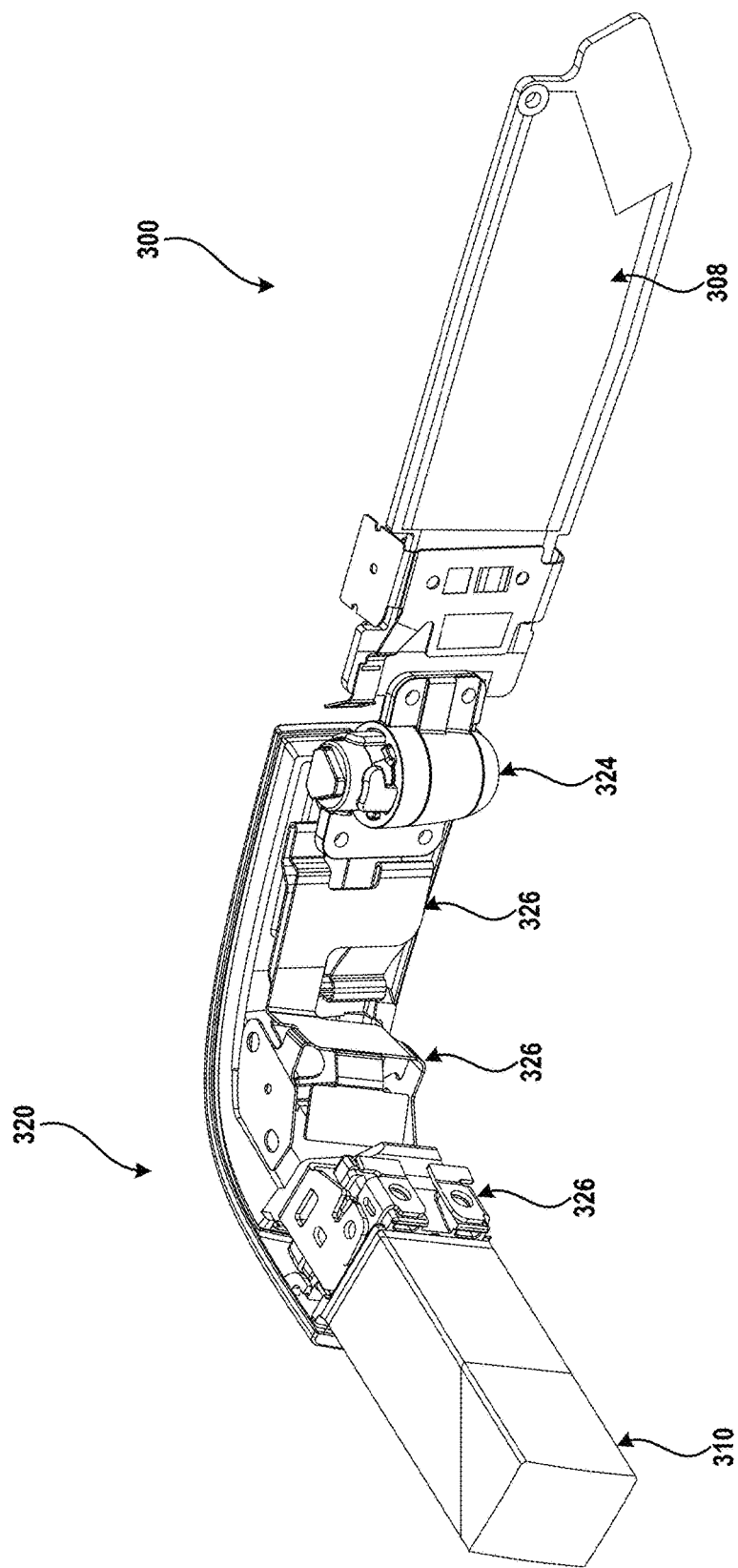
FIG. 4 illustrates a conductive subframe and a hinge, in accordance with example embodiments.

FIG. 4 illustrates a close-up view of a second side of eyepiece 320. Eyepiece 320 includes therein subframe 326 which provides a rigid structure to which various components such as image capture device 312, display 310, and display driver 314 are connected. Subframe 326 is made of a conductive material (e.g., copper or aluminum) and is thus able to spread heat generated by any electronic components connected thereto. For example, by spreading heat away from image capture device 312, videos may be captured at a consistent frame rate (e.g., 30 frames per second, 60 frames per second). Similarly, by spreading heat away from display driver 314, display 310 may display content at a consistent frame rate and/or with a desired brightness. Subframe 326 may spread heat throughout the entire volume of eyepiece 320, thus reducing the likelihood of high-temperature regions occurring within eyepiece 320 and causing electronic components to malfunction or underperform.

Eyepiece 320 may be connected to frame component 300 by way of hinge 324. Hinge 324 may be made out of a conductive material or include running therethrough structures configured to conduct heat (e.g., graphite thermal straps). In some implementations, hinge 324 may be in thermal contact with subframe 326 and one or more of conductive plate 316B, conductive layer 317B, or another conductive feature in second compartment 302B. Thus, heat generated by components connected the subframe 326 may be transferred through hinge 324 to second compartment 302B. This heat may be further transferred from second compartment 302B to first compartment 302A by way of heat pipe 304, as previously described. Accordingly, the combination of subframe 326, conductive hinge 324, and heat pipe 304 allows for heat generated at one end of the HMD, namely, in eyepiece 302, to be transferred to an opposite end of the HMD, namely, first compartment 302A. Further, this manner of heat transfer allows for the heat to be dissipated along a large portion of the HMD frame (rather than through selected regions thereof), thus increasing the surface area used to cool the HMD and the cooling rate of the HMD.

In some embodiments, the rate of heat transfer through hinge 324 may change as the hinge is opened and closed. For example, when the hinge is in an open conformation, as shown in FIG. 4, the rate of heat transfer may be high (e.g., above a threshold value) due to a number of conducting parts being in thermal contact with one another. When the hinge is in a folded conformation, with eyepiece 320 folded against frame component 300 (e.g., folded for storage), the rate of heat transfer may be lower (e.g., below the threshold value) due to a smaller number of conducting parts being in thermal contact with one another. For example, when the HMD is open, part of the hinge may make thermal contact with conductive plate 316B or conductive layer 317B. This contact may be broken when the HMD is folded.

IV. ADDITIONAL EXAMPLE OPERATIONS

Figure 5:
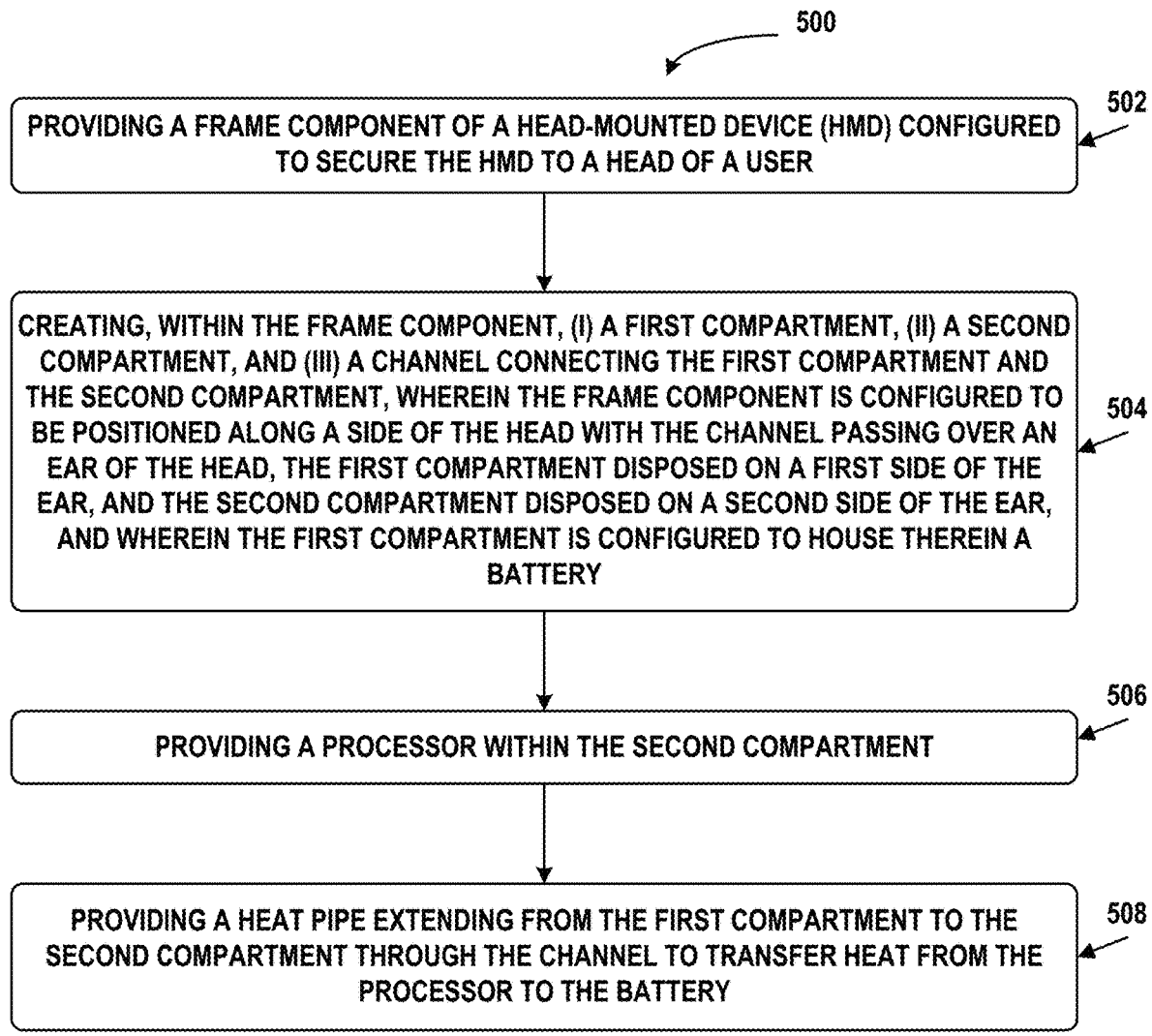
FIG. 5 illustrates a flow chart, in accordance with example embodiments.

FIG. 5 illustrates flow chart 500 of operations related to manufacturing and assembling an HMD or portion thereof. The operations may be used to manufacture and assemble an apparatus in accordance with FIGS. 3A, 3B, 3C, and 4.

Block 502 involves providing a frame component of an HMD configured to secure the HMD to a head of a user.

Block 504 involves creating, within the frame component, (i) a first compartment, (ii) a second compartment, and (iii) a channel connecting the first compartment and the second compartment. The frame component is configured to be positioned along a side of the head with the channel passing over an ear of the head, the first compartment disposed on a first side of the ear (e.g., posterior to the ear), and the second compartment disposed on a second side of the ear (e.g., anterior to the ear). The first compartment may be configured to house therein a battery. Crating the compartments and channel may involve, for example, molding the frame component out of plastic to define therein the components and channel.

In some embodiments, the process may involve providing, a battery within the first compartment. The battery may be secured within the first compartment by way of mechanical means such as screws or straps, or may be glued using an adhesive.

Block 506 involves providing a processor within the second compartment. The processor may be provided on a PCB with other electronic components thereon. The PCB may be mechanically connected to the frame component using, for example, screws.

Block 508 involves providing a heat pipe extending from the first compartment to the second compartment through the channel to transfer heat from the processor to the battery. The ends of the heat pipe may be secured to the battery and the processor or the PCB by way of a thermally conductive adhesive, grease, or gel.

In some embodiments, the channel connects a top portion of the first compartment to a top portion of the second compartment. The heat pipe spans the first compartment by extending diagonally from a bottom portion of the first compartment to the top portion of the first compartment. The heat pipe also spans the second compartment by extending diagonally from a bottom portion of the second compartment to the top portion of the second compartment.

In some embodiments, the heat pipe spans the battery by extending diagonally from a first corner of the battery to a second corner of the battery to dissipate heat from the processor across an area of the battery.

In some embodiments, the HMD also includes an eyepiece having a thermally conductive subframe, a display disposed on and thermally connected to the subframe, and a camera disposed on and thermally connected to the subframe. The first compartment is disposed posterior to the ear and the second compartment is disposed anterior to the ear. The HMD additionally includes a hinge connecting the eyepiece to the second compartment of the frame component. The hinge is thermally conductive and configured to thermally connect the subframe to the second compartment to transfer heat from (i) the display and camera to (ii) the heat pipe.

In some embodiments, a rate of heat transfer through the hinge is greater than a threshold value when the hinge is in an open conformation that configures the frame component to be positioned along the side of the head. The rate of heat transfer through the hinge is smaller than the threshold value when the hinge is in a folded conformation that configures the frame component to be positioned for storage.

In some embodiments, a first surface area of a portion of the frame component defining the first compartment may be greater than a second surface area of the frame component defining the second compartment.

In some embodiments, a first end of the heat pipe is in thermal contact with the battery and a second end of the heat pipe is in thermal contact with the processor.

In some embodiments, the HMD also includes a first conductive plate disposed within the first compartment. The battery may be disposed on and in thermal contact with the first conductive plate. A first end of the heat pipe may be in thermal contact with the first conductive plate. The HMD additionally includes a second conductive plate disposed within the second compartment. The processor may be disposed on and in thermal contact with the second conductive plate. A second end of the heat pipe may be in thermal contact with the first conductive plate.

In some embodiments, the first conductive plate may span an area of the battery. The second conductive plate may span an area of a printed circuit board on which the processor is disposed.

In some embodiments, portions of a first side of the frame component may be configured to be positioned in contact with the side of the head. The HMD may also include one or more first conductive features disposed on the first conductive plate and projecting perpendicularly therefrom to mate with one or more corresponding first openings in a second side of the frame component to transfer heat away from the side of the head. The second side is opposite to the first side. The HMD may additionally include one or more second conductive features disposed on the second conductive plate and projecting perpendicularly therefrom to mate with one or more corresponding second openings in the second side of the frame component to transfer heat away from the side of the head.

In some embodiments, portions of a first side of the second compartment may be configured to be positioned in contact with the side of the head. The HMD may also include an insulating plate disposed within the second compartment between the first side of the second compartment and the processor to insulate the side of the head from heat generated by the processor.

In some embodiments, the channel may be a first channel. The heat pipe may include a second channel defined by a conductive material and a fluid disposed within the second channel and configured to (i) be vaporized by heat absorbed at a first end of the heat pipe disposed within, the second compartment, (ii) travel as vapor along a length of the second channel to a second end of the heat pipe disposed within the first compartment, and (iii) be condensed at the second end of the heat pipe as heat is transferred therefrom to the battery. The heat pipe may further include a wick structure disposed circumferentially within the second channel and configured to transfer the condensed fluid from the second end of the heat pipe to the first end of the heat pipe by way of capillary action.

V. CONCLUSION

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software or hardware modules in the same physical device. However, other information transmissions may be between software modules or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

The invention claimed is:

1. An apparatus comprising:
a frame component of a head-mounted device (HMD) configured to secure the HMD to a bead of a user, the frame component comprising therein (i) a first compartment, (ii) a second compartment, and (iii) a channel connecting the first compartment and the second compartment, wherein the frame component is configured to be positioned along a side of the head with the channel passing over an ear of the head, the first compartment disposed on a first side of the ear, and the second compartment disposed on a second side of the ear;
an eyepiece comprising a thermally conductive subframe;
a battery disposed within the first compartment;
a processor disposed within the second compartment;
a heat pipe extending from the first compartment to the second compartment through the channel and configured to transfer heat from the processor to the battery; and
a hinge connecting the eyepiece to the second compartment of the frame component, wherein the hinge is thermally conductive and configured to transfer heat from the eyepiece to the heat pipe, wherein a rate of heat transfer through the hinge is greater than a threshold value when the hinge is in an open conformation that configures the frame component to be positioned along the side of the head, and wherein the rate of heat transfer through the hinge is smaller than the threshold value when the hinge is in a folded conformation that configures the frame component to be positioned for storage.

2. The apparatus of claim 1, wherein the channel connects a top portion of the first compartment to a top portion of the second compartment, wherein the heat pipe spans the first compartment by extending diagonally from a bottom portion of the first compartment to the top portion of the first compartment, and wherein the heat pipe spans the second compartment by extending diagonally from a bottom portion of the second compartment to the top portion of the second compartment.

3. The apparatus of claim 1, wherein the heat pipe spans the battery by extending diagonally from a first corner of the battery to a second corner of the battery to dissipate heat from the processor across an area of the battery.

4. The apparatus of claim 1, wherein the first compartment is disposed posterior to the ear, wherein the second compartment is disposed anterior to the ear, and wherein the eyepiece further comprises a display and a camera both thermally connected to the subframe.

5. The apparatus of claim 1, further comprising:
a first conductive plate disposed within the first compartment and a second conductive plate disposed within the second compartment, wherein a first end of the heat pipe is in thermal contact with the first conductive plate; and
wherein a second end of the heat pipe is in thermal contact with the second conductive plate.

6. The apparatus of claim 5, wherein the battery is disposed on and in thermal contact with the first conductive plate, and wherein the processor is disposed on and in thermal contact with the second conductive plate.

7. The apparatus of claim 1, wherein a first surface area of a portion of the frame component defining the first compartment is greater than a second surface area of the frame component defining the second compartment.

8. The apparatus of claim 1, wherein a first end of the heat pipe is in thermal contact with the battery, and wherein a second end of the heat pipe is in thermal contact with the processor.

9. The apparatus of claim 6, wherein the first conductive plate spans an area of the battery, and wherein the second conductive plate spans an area of a printed circuit board on which the processor is disposed.

10. The apparatus of claim 6, wherein portions of a first side of the frame component are configured to be positioned in contact with the side of the head, and wherein the apparatus further comprises:
one or more first conductive features disposed on the first conductive plate and projecting perpendicularly therefrom to mate with one or more corresponding first openings in a second side of the frame component to transfer heat away from the side of the head, wherein the second side is opposite to the first side; and
one or more second conductive features disposed on the second conductive plate and projecting perpendicularly therefrom to mate with one or more corresponding second openings in the second side of the frame component to transfer heat away from the side of the head.

11. The apparatus of claim 1, wherein portions of a first side of the second compartment are configured to be positioned in contact with the side of the head, and wherein the apparatus further comprises:
an insulating plate disposed within the second compartment between the first side of the second compartment and the processor to insulate the side of the head from heat generated by the processor.

12. The apparatus of claim 1, wherein the channel is a first channel, and wherein the heat pipe comprises:
a second channel defined by a conductive material;
a fluid disposed within the second channel and configured to (i) be vaporized by heat absorbed at a first end of the heat pipe disposed within the second compartment, (ii) travel as vapor along a length of the second channel to a second end of the heat pipe disposed within the first compartment, and (iii) be condensed at the second end of the heat pipe as heat is transferred therefrom to the battery; and
a wick structure disposed circumferentially within the second channel and configured to transfer the condensed fluid from the second end of the heat pipe to the first end of the heat pipe by way of capillary action.

13. A system comprising:
a frame component of a head-mounted device (HMD) configured to secure the HMD to a head of a user, the frame component comprising therein (i) a first compartment, (ii) a second compartment, and (iii) a channel connecting the first compartment and the second compartment, wherein the frame component is configured to be positioned along a side of the head with the channel passing over an ear of the head;
a battery disposed within the first compartment;
a processor disposed within the second compartment;
an eyepiece comprising a display;
a hinge connecting the eyepiece to the second compartment of the frame component, wherein the hinge is thermally conductive and configured to thermally connect the eyepiece to the second compartment, wherein a rate of heat transfer through the hinge is greater than a threshold value when the hinge is in an open conformation that configures the frame component to be positioned along the side of the head, and wherein the rate of heat transfer through the hinge is smaller than the threshold value when the hinge is in a folded conformation that configures the frame component to be positioned for storage; and
a heat pipe extending from the first compartment to the second compartment and configured to transfer heat from the processor and the eyepiece to the battery.

14. The system of claim 13, wherein the eyepiece further comprises a display and a camera, and wherein the system further comprises a thermally conductive subframe, wherein the display and the camera are disposed on and thermally connected to the subframe, and wherein the thermally conductive subframe is configured to transfer heat from the display and the camera to the hinge.

15. The system of claim 13, wherein the channel connects a top portion of the first compartment to a top portion of the second compartment, wherein the heat pipe spans the first compartment by extending diagonally from a bottom portion of the first compartment to the top portion of the first compartment, and wherein the heat pipe spans the second compartment by extending diagonally from a bottom portion of the second compartment to the top portion of the second compartment.

16. The system of claim 13, wherein a first end of the heat pipe is in thermal contact with the battery, and wherein a second end of the heat pipe is in thermal contact with the processor.

17. The system of claim 13, further comprising:
a first conductive plate disposed within the first compartment, wherein the battery is disposed on and in thermal contact with the first conductive plate, and wherein a first end of the heat pipe is in thermal contact with the first conductive plate; and
a second conductive plate disposed within the second compartment, wherein the processor is disposed on and in thermal contact with the second conductive plate, and wherein a second end of the heat pipe is in thermal contact with the first conductive plate.

18. The system of claim 17, wherein portions of a first side of the frame component are configured to be positioned in contact with the side of the head, and wherein the system further comprises:
one or more first conductive features disposed on the first conductive plate and projecting perpendicularly therefrom to mate with one or more corresponding first openings in a second side of the frame component to transfer heat away from the side of the head, wherein the second side is opposite to the first side; and
one or more second conductive features disposed on the second conductive plate and projecting perpendicularly therefrom to mate with one or more corresponding second openings in the second side of the frame component to transfer heat away from the side of the head.

19. A device formed by a process comprising:
providing a frame component of a head-mounted device (HMD) configured to secure the HMD to a head of a user;
creating, within the frame component, (i) a first compartment, (ii) a second compartment, and (iii) a channel connecting the first compartment and the second compartment, wherein the frame component is configured to be positioned along a side of the head with the channel passing over an ear of the head, the first compartment disposed on a first side of the ear, and the second compartment disposed on a second side of the ear, and wherein the first compartment is configured to house therein a battery;

providing an eyepiece comprising a thermally conductive subframe and one or more components thermally connected to the subframe;

providing a processor within the second compartment;

providing a heat pipe extending from the first compartment to the second compartment through the channel to transfer heat from the processor to the battery; and providing a hinge connecting the eyepiece to the second compartment of the frame component, wherein the hinge is thermally conductive and configured to transfer heat from the one or more components to the heat pipe, wherein a rate of heat transfer through the hinge is greater than a threshold value when the hinge is in an open conformation that configures the frame component to be positioned along the side of the head, and wherein the rate of heat transfer through the hinge is smaller than the threshold value when the hinge is in a folded conformation that configures the frame component to be positioned for storage.

20. The device of claim 19, wherein the one or more components include a display and a camera.

* * * * *